United States Patent [19]

Lurie

[11] Patent Number: 4,613,904
[45] Date of Patent: Sep. 23, 1986

[54] TELEVISION MONITORING DEVICE

[75] Inventor: Oscar M. Lurie, Bethesda, Md.

[73] Assignee: Control Data Corporation, Minneapolis, Minn.

[21] Appl. No.: 589,629

[22] Filed: Mar. 15, 1984

[51] Int. Cl.$^4$ .............................................. H04N 7/08
[52] U.S. Cl. .................... 358/142; 358/141; 358/84
[58] Field of Search ............ 358/142, 84, 141, 146; 340/707, 715, 365 P; 434/323; 273/DIG. 28

[56] References Cited

U.S. PATENT DOCUMENTS

| | | | |
|---|---|---|---|
| 3,599,221 | 8/1971 | Baer | 434/323 |
| 3,742,463 | 6/1973 | Haselwood et al. | 358/84 |
| 3,829,095 | 8/1974 | Baer | 273/DIG. 28 |
| 3,848,082 | 11/1974 | Summers | 358/146 |
| 4,044,376 | 8/1977 | Porter | 358/84 |
| 4,206,557 | 6/1980 | Swinton | 434/323 |
| 4,329,684 | 5/1982 | Monteath et al. | 340/707 |

OTHER PUBLICATIONS

Summers, George D. "The Data Dot TM System" Signal, (vol. 29, No. 4), 1/75, pp. 35–42.

Primary Examiner—Tommy P. Chin
Assistant Examiner—David E. Harvey
Attorney, Agent, or Firm—J. A. Genovese; R. M. Angus

[57] ABSTRACT

A channel identifying rolling bar code, transmitted with a television broadcast signal, is displayed at a selected location on the receiving television screen. An apparatus is secured to the television set to view the rolling bar code to identify the channel being transmitted and process that information as necessary to detect the periods of time that different channels are received by the particular set. That information is stored in an internal memory for eventual use by a central processor.

8 Claims, 3 Drawing Figures

TELEVISION MONITORING DEVICE

The invention relates to the field of television monitoring devices.

In the past it has been most common to place a monitoring unit adjacent to the T.V. set which is being monitored. The monitoring unit typically would include electronics which in some way detect the television channel to which the television was tuned at any given time. The unit would collect information on the time during the day when channels were being viewed and transmit this information to a central computer for analysis. The monitoring units were often relatively bulky and expensive and the overall expense of this monitoring system was quite large in that one unit was required for each television set.

U.S. Pat. No. 4,329,684 (Monteath et al) discloses a system wherein a light pen is used to selected programs to be viewed either from the T.V. screen itself or from a printed program menu having bar codes representing each T.V. program. The present invention, in the preferred embodiment, utilizes a photocell to read channel identifying information directly from the television set. The light pen in Monteath et al includes a photocell which reads directly from the "window" on the screen. The window is made dark or light as required, during successive fields, or bit cells, to indicate a successive train of binary digits. The program selected is coded into a binary word which is "rolled" past the window and read by the pen. Circuitry is associated with the pen to pulse shape, or convert, the information back into its original digital form prior to transmitting it to the television control circuitry.

SUMMARY

According to the present invention, a channel identifying rolling bar code would be displayed at a selected location of the television screen, such as in the lower right-hand corner of the screen. A device is secured over the location, or window, of the T.V. screen at which the rolling bar code is displayed. The device includes a photocell which reads the rolling bar code identifying the channel being transmitted and processes that information as necessary to detect the periods of time that the different channels are viewed. The information is stored in an internal memory.

The invention improves the prior art television monitoring devices in that the device comprises a very compact and inexpensive unit which is removably secured to the T.V. screen for periodical return to the originator for processing. A fresh monitoring device may be attached to the T.V. screen upon removal of the old one. Consequently, the need for a relatively complex and expensive monitoring unit to be associated with each T.V. set to be monitored and to be in periodic communication with a central processing unit would be avoided. Hence, the overall system would be far easier to operate and far less expensive.

DESCRIPTION OF THE PRESENTLY PREFERRED EMBODIMENT

Figure 1:
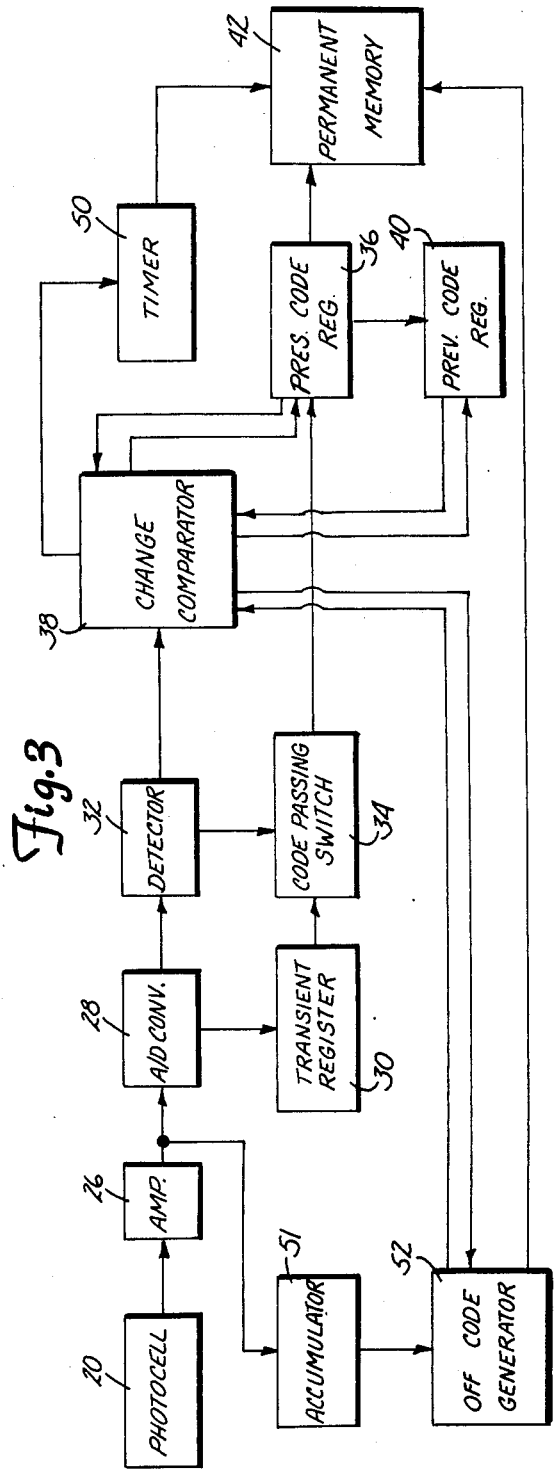
FIG. 1 is a perspective view of a monitoring device according to the presently preferred embodiment of the present invention attached to a portion of a T.V. screen.
Figure 2:
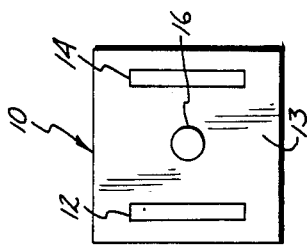
FIG. 2 is an enlarged view of the underside of the device shown in FIG. 1.

As shown in FIG. 1, the present invention comprises a monitoring device 10 which is removably secureable over the lower right-hand corner of a T.V. screen 5. As shown in FIG. 2, the device 10, is enclosed by a housing 11 and equipped with oppositely disposed adhesive strips 12 and 14, for example, for removably fastening it to the T.V. screen. The adhesive strips could, of course, be of any suitable shape. The underside 13 of housing 11 includes an aperture 16 through which the photocell (not shown) reads a rolling bar code displayed on the T.V. screen. The television station broadcaster would intermittently display the bar code signal at the designated code signal location on the screen. The actual generation, transmission, and display of the channel identifying rolling bar code signal is not a part of the invention, and thus, the manner for accomplishing it is not disclosed herein. However, reference has been made to U.S. Pat. No. 4,329,684 for a description of how rolling bar codes may be displayed on a screen.

The device 10 is removably secureable to the T.V. screen with the aperture 16 directly located over the code signal location on the screen.

Figure 3:
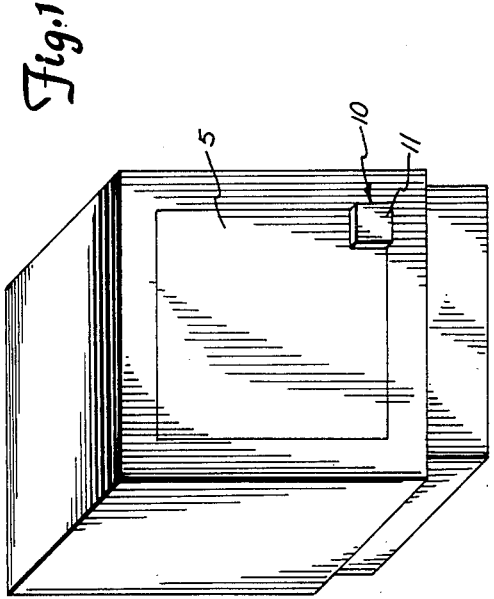
FIG. 3 is a block diagram of the circuitry of the device shown in FIGS. 1 and 2.

FIG. 3 shows a functional block diagram of the circuitry of the invention.

In the present embodiment, the rolling bar coded channel identifying signal is displayed periodically, as noted. The photocell 20 would, therefore, normally pick up only noise from the T.V. screen which would not be recognized by detector 32, and thus, code passing switch 34 would remain open. When the channel identifying signal is displayed, however, the operation of the invention proceeds as follows. The channel identifying signal comprises a standard "start word" followed by a "channel identifying word" followed by an "end word". The term "word" is used to indicate respective segments of the bar coded message which is detected in analog form by photocell 20, and amplified in amplifier 26 before being converted into digital words by analog to digital converter 28 (by a pulse-shaper, for example). The start and end word portions of the signal are standard, and thus, the same for all channel identification signals. The channel identifying word would, of course, be specific to the channel being broadcast. The three-part digital word generated by analog-to-digital converter 28 is delivered simultaneously to detector 32 and transient register 30. Detector 32 recognize the standard start word to close code passing switch 34 to permit the channel identifying word to be transmitted from transient register 30 to present code register 36. Detector 32 then detects the standard stop word to open switch 34 and terminate the transmission to present code register 36. In addition, in response to the standard stop word, detector 32 provides an enable signal to change comparator 38 to cause change compare 38 to compare the contents of present code register 36 with the contents in previous code register 40. If the previous code register is either empty or stores a different channel ID code, the change comparator 38 detects a noncorrespondence, causing the contents of present code register 36 to be loaded into permanent memory 42. At the same time, change comparator 38 provides a signal to internal timer 50 causing current time information to be stored in permanent memory 42. Thus, the present channel identifying information, and the time that the channel is first detected, are loaded into the permanent memory 42 together. Change comparator 38 also clears previous code register 40 and loads register 40 with the contents of present code register 36 at this time.

If the channel is not changed before the next time the three-part word is received by detector 32, detector 32 again closes switch 34 to transmit the channel identifying word from transient register 30 to present code register 36. Change comparator 38 compares the contents of present code register 36 with previous code register 40. In this case, the contents will be the same, and change comparator 38 will simply clear the contents of present code register 36.

Once the channel has been changed, however, at the next channel identifying transmission, detector 32, in response to the standard start word, will again close code passing switch 34 to transmit the channel identifying word from transient register 30 to present code register 36. The standard stop word will then be detected by detector 32 to open code passing switch 34 and change comparator 38 will again compare the contents of the present code register 36 with that of the previous code register 40. In this case, a change will be detected and the change comparator 38 will load permanent memory 42 with the contents of present code register 36 and the current time from timer 50. Also, the contents of present code register 36 will be simultaneously shifted to previous code register 40.

Since each channel identifying word is loaded into memory 42 together with the time that the channel status was changed by the viewer, the time period during which the channel was being viewed may be readily determined from the contents of the memory.

It is important, of course, that some mechanism be provided to indicate to the system when the television set has been turned off so that an appropriate code can be transferred into permanent memory 42 along with the time at which the television is turned off. To accomplish this objective, an accumulator circuit 51 is fed the output of amplifier 26. The accumulator circuit could, for example, include a timing capacitor which remains charged so long as a signal is provided from amplifier 26. The signal will normally comprise noise from the television screen but intermittently will comprise the digital channel identifying signal. If no signal is applied to the timing capacitor for a sufficient period of time, the capacitor will discharge below a selected charge level and accumulator circuit 51 will operate off code generator 52 to provide a signal to change comparator 38 that the television set had been turned off. Change comparator 38, in response to this signal, loads the contents of off code generator 52 into permanent memory 42 along with the current time from timer 50. At this time, change comparator 38 also clears the contents of both present code register 36 and previous code register 40.

When the television set is again turned on, the timing capacitor of accumulator circuit 51 charges sufficiently to disable off code generator 52. At the first transmission of a channel identification code, detector 32 passes the channel identifying word to present code register 36. Change comparator 38 compares the contents of register 36 with the contents of register 40 and detect a change because register 40 had been previously cleared. Change comparator 38, therefore, transfers the contents of register 36 into memory 42 along with the current time while simultaneously transferring the contents of register 36 into register 40, all according to the procedure previously discussed above.

The viewer may periodically remove the device 10 and return it to the originator, replacing the device 10 with a fresh one. The originator may process the data recorded in permanent memory 42 in order to determine the channel viewing information.

In the embodiment described, the timing information is provided by internal timer 50 under the control of change comparator 38. Alternatively the current time and date of transmission may be included as part of the digital signal supplied by the broadcaster. If that were the case, timer 50 and its attendant circuitry would be eliminated and both a channel identifying word and a time and date word would be included in the transmission between the start and end words. The invention would in other respects operate in essentially the same fashion as already described, with the time and date information being excluded from the comparison but being loaded from register 36 directly into memory 42 along with the channel identifying word. The time information would be updated in present code register 36 upon each received transmission of a channel identifying signal. Accumulator 51, and off code generator 52 would be utilized in the same way as previously described to load an appropriate off code, without a time and date, into memory 42 when the T.V. set is turned off. However, when off code generator 52 detects an off condition to the T.V. receiver, it will operate present code register 36 to transfer the time information stored therein (namely the time and date associated with the last channel identifying signal) to the memory so that the time the T.V. receiver was turned off can be approximated.

Having disclosed the presently preferred embodiment of the invention, together with one alternate variation, many modifications and other variations thereof will be obvious to those skilled in the art. Accordingly, the invention is intended to be limited only by the scope of the appended claims.

I claim:

1. Television monitoring apparatus for monitoring reception status of a television receiver capable of selecting one of a plurality of transmitted wave signals each containing a channel identification signal, each of said wave signals representing a separate video channel, said television receiver having a display screen for displaying program material associated with a selected video channel, said television receiver being responsive to the channel identification signal of a selected wave signal for displaying channel identification information representative of the selected video channel at a predetermined location on said display screen, said monitoring apparatus comprising: a housing; means removably fastening said housing to said predetermined location on said display screen; photo-sensor means in said housing for reading said channel identification information currently being displayed; previous-code register means in said housing for storing a first channel identification word relating to channel identification information previously read by said photo-sensor means; memory means in said housing; and processor means in said housing responsive to said photo-sensor means and said previous-code register means for operating said memory means and said previous-code register means to store a current channel identification word relating to said currently displayed channel identification information read by said photo-sensor means which does not correspond to said first channel identification word stored in said previous-code register means.

2. Apparatus according to claim 1 further including timer means for generating time data, said processor means being responsive to said photo-senor means and said previous-code register means for operating said memory means to store said time data when said memory means is operated to store said current channel identification information.

3. Apparatus according to claim 1 wherein said photo-sensor means provides a data signal representative of said currently displayed channel identification information being read from said display screen, said data signal comprising a start word, a channel identification word, and an end word, said processor means including present-code register means for storing said current channel identification word, compare means for comparing the contents of said present-code register means and said previous-code register means, and detector means responsive to a start word to operate said present-code register means to store the current channel identification word of the data signal from said photo-sensor means and further responsive to said end word to operate said compare means to compare the contents of said present-code register means to the contents of said previous-code register means, said memory means and said previous-code register means being responsive to said compare means to store the contents of said present-code register means when said compare means detects a non-correspondence between the contents of said present-code register means and said previous-code register means.

4. Apparatus according to claim 3 further including timer means for generating time data, said memory means being operable to store said time data when said memory means responds to said non-correspondence detected by said compare means.

5. Apparatus according to claim 3 wherein said data signal includes a current time code, said detector means being further responsive to said start word to operate said present-code register means to store said current time code.

6. Apparatus according to claim 3 further including charge accumulator means connected to said television receiver to be charged while said television receiver is operated and to be discharged while said television receiver is not operated, off code generator means for generating an off code, said memory means being responsive to a discharged condition of said accumulator means to store said off code.

7. Apparatus according to claim 6 further including timer means for generating time data, said memory means being operable to store said time data when said memory means responds to said non-correspondence detected by said compare means.

8. Apparatus according to claim 6 wherein said data signal includes a current time code, said detector means being further responsive to said start word to operate said present-code register means to store said current time code.

* * * * *